May 6, 1930.  F. L. DAVIDSON  1,757,831
DISHWASHING MACHINE
Filed Oct. 29, 1927  2 Sheets-Sheet 1

Inventor
F. L. Davidson
By Caron & Caron
Attorneys

May 6, 1930. F. L. DAVIDSON 1,757,831
DISHWASHING MACHINE
Filed Oct. 29, 1927 2 Sheets-Sheet 2
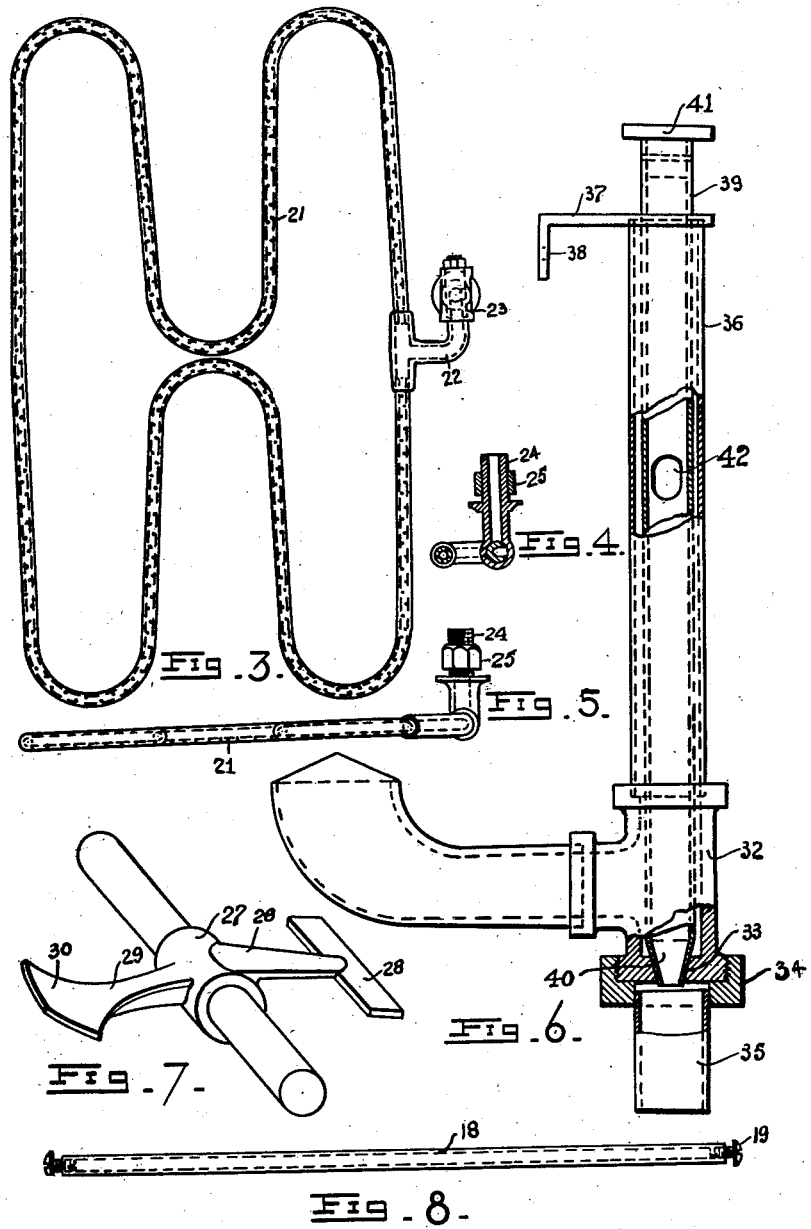
Inventor
F. L. Davidson
By Caron & Caron
Attorneys Patented May 6, 1930

1,757,831

UNITED STATES PATENT OFFICE

FREDERICK LELAND DAVIDSON, OF HALIFAX, NOVA SCOTIA, CANADA

DISHWASHING MACHINE

Application filed October 29, 1927. Serial No. 229,555.

My invention relates to a dishwashing machine and more particularly to a machine wherein the dishes are washed by splashing the water, preferably by means of a motor.

The object of my invention is to produce a very effective machine, highly sanitary and economical in use.

In the accompanying drawings, forming part of the following description, similar reference symbols refer to same parts throughout the several views.

Figure 3 shows the form of the spraying tube;

Figure 4 is a sectional detail of the valve attached to the spraying tube;

Figure 5 shows the valve connected to a section of the spraying tube;

Figure 6 is a view, partly in section, of the draining tube;

Figure 7 is a view of a splasher; and

Figure 8 shows the construction of one of the supports for the tray and plate rack.

Figure 1:
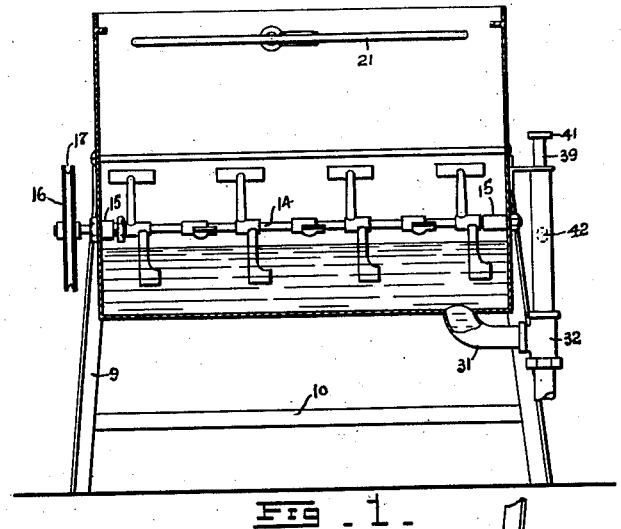
Figure 1 is a longitudinal sectional elevation of a dishwashing machine constructed according to my invention.
Figure 2:
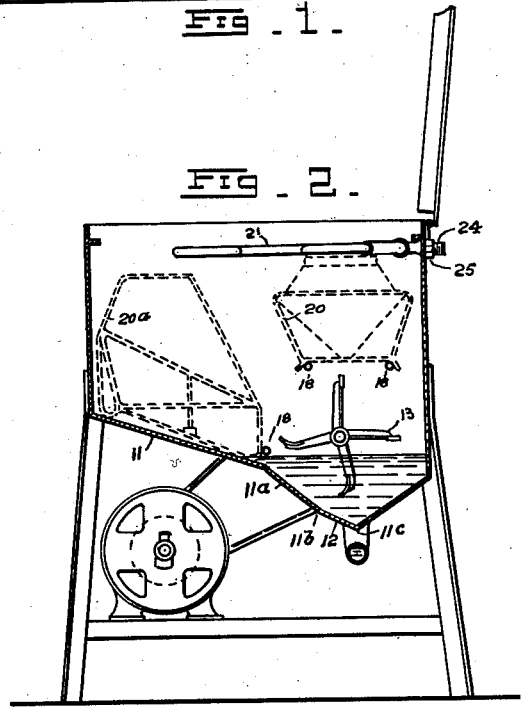
Figure 2 is a cross section thereof.

The dishwasher comprises a container mounted on legs 9 suitably braced as at 10. The container has straight walls and is provided with an inclined bottom 11 terminating in a trough-like portion 12 where the water accumulates. This bottom inclines regularly up to 11$^a$, then more abruptly up to a point 11$^b$, then less abruptly to the bottom 11$^c$ of the trough.

In this portion 12 a set of splashers 13 are mounted on a shaft 14, which shaft is suitably held in bearings 15 mounted through the walls of the container. A driving pulley 16 is mounted on one end of the shaft 14. This pulley is preferably made with a V-groove 17 to receive a belt. Over the splashers 13 cross rods 18 are supported by the end walls of the container. These rods are preferably made out of brass tubing tinned throughout. Each end of this tube is screw-threaded to receive a screw 19 which passes through the end walls of the container and engages the threads of the rod. Such rods form a firm support for dish racks 20 as well as dish rack 20$^a$, shaped to rest on the inclined bottom 11.

The water spraying device illustrated in Figure 3, consisting of a tube 21, is preferably formed as shown although changes could be made which may be as effective. So that the water will be sprayed when the cover of the container is closed, it is mounted to be raised and lowered at the same time as the cover. To effect this purpose, a T elbow 22 is connected to the spraying tube 21. The end of elbow 22 is conical in shape and serves as a spigot for a valve controlling the water. This spigot is ground and rotates in a valve seat 23 formed in a coupling 24, shaped to engage the side of the container and fastened thereto by a nut 25. Thus constructed, it will be seen that when the spraying tube 21 is raised the valve will be closed, and vice versa. The spraying tube is provided with a plurality of perforations positioned to permit the water to spray the dishes placed underneath the same.

The splashers herein described are of a novel construction. The vane 26 extends outwardly from a hub 27 and is provided with a cross paddle 28; while the vane 29, which also extends from the hub 27, is curvilinear lengthwise and provided with a flattened end portion 30.

The trough portion 12 of the container is provided with a draining pipe 31 connected to a T 32, which is provided at its lower end with a valve seat 33 and a buckle 34 mounted to receive a drain pipe 35. The upper end of the T 32 is threaded to receive a sleeve 36 which is provided at its upper end with a bracket 37 perforated at 38 to permit the same to be connected to the container side by a suitable screw. Inside the sleeve 36 is mounted a tube 39 carrying at its lower end a valve 40 shaped to engage the seat 33. In tube 39,—somewhat remote from its upper end,—is a slot 42 intended to act as an overflow to regulate the height of the water in the container. The upper end of tube 39 is provided with a disk 41 to enable the same to be grasped when it is desired to open the valve to drain the water in the container.

What I claim, is:—

In a plate and dish washing machine, a container, a spraying tube swingingly mounted therein, said tube shaped to form a double loop, a T coupling connected to one side of said loop, an elbow forming part of said T coupling, a valve connected to said coupling, comprising a spigot disposed so as to close the valve when the spraying tube is raised, and means to connect said valve to a supply of water.

In testimony whereof, I have hereto affixed my signature, this 10th day of August, A. D. 1927, at the city of Halifax, in the Province of Nova Scotia, Canada.

FREDERICK LELAND DAVIDSON.